US011460658B1

(12) United States Patent
Chamoun et al.

(10) Patent No.: US 11,460,658 B1
(45) Date of Patent: Oct. 4, 2022

(54) RETRACTABLE REEL FOR HANDLING OPTICAL FIBER

(71) Applicant: Palo Alto Research Center Incorporated, Palo Alto, CA (US)

(72) Inventors: Jacob N. Chamoun, Somerville, MA (US); Qiushu Chen, San Jose, CA (US); Peter Kiesel, Palo Alto, CA (US); Mark R. Teepe, Menlo Park, CA (US); Kyle Arakaki, Mountain View, CA (US)

(73) Assignee: Palo Alto Research Center Incorporated, Palo Alto, CA (US)

( * ) Notice: Subject to any disclaimer, the term of this patent is extended or adjusted under 35 U.S.C. 154(b) by 0 days.

(21) Appl. No.: 17/235,138

(22) Filed: Apr. 20, 2021

(51) Int. Cl.
  *G02B 6/44* (2006.01)
  *G01L 1/24* (2006.01)
  *G02B 6/02* (2006.01)

(52) U.S. Cl.
  CPC ............ *G02B 6/4457* (2013.01); *G01L 1/246* (2013.01); *G02B 6/02076* (2013.01)

(58) Field of Classification Search
  None
  See application file for complete search history.

(56) References Cited

U.S. PATENT DOCUMENTS

| 6,668,105 B2 | 12/2003 | Chen et al. |
| 7,315,681 B2 | 1/2008 | Kewitsch |
| 7,358,858 B2 | 4/2008 | Ozawa et al. |
| 8,474,742 B2 | 7/2013 | Smrha |
| 10,838,163 B2 | 11/2020 | Gronvall |
| 2019/0062100 A1 | 2/2019 | Mertesdorf |

FOREIGN PATENT DOCUMENTS

| CN | 111812785 A | * | 10/2020 | |
| CN | 112217144 A | * | 1/2021 | |
| EP | 2247971 | | 11/2010 | |
| FR | 2630419 A1 | * | 10/1989 | ........... G02B 6/4457 |
| WO | WO-2005031401 A2 | * | 4/2005 | ........... G02B 6/4457 |

* cited by examiner

*Primary Examiner* — Chad H Smith
(74) *Attorney, Agent, or Firm* — Mueting Raasch Group

(57) ABSTRACT

A cassette for optical fiber includes one or more optical sensors. The cassette has a spool for handling optical fiber. An adjustable shaft is disposed such that the spool is configured to rotate about the adjustable shaft. The adjustable shaft is configured to handle spools having different diameters. A spool controller is coupled to the adjustable shaft and configured to rotate the adjustable shaft to perform one or more of extract and retract the optical fiber. One or more bushings are disposed proximate the spool and are configured to prevent the optical fiber from jumping off the spool.

19 Claims, 22 Drawing Sheets

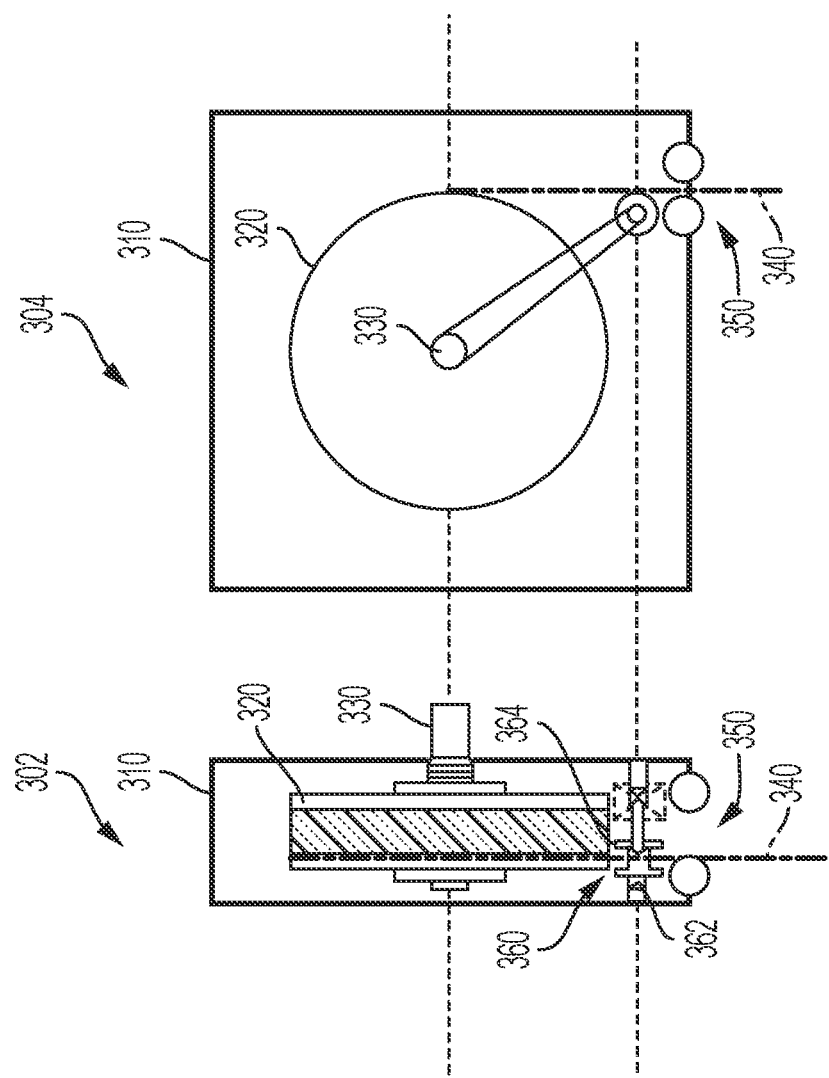

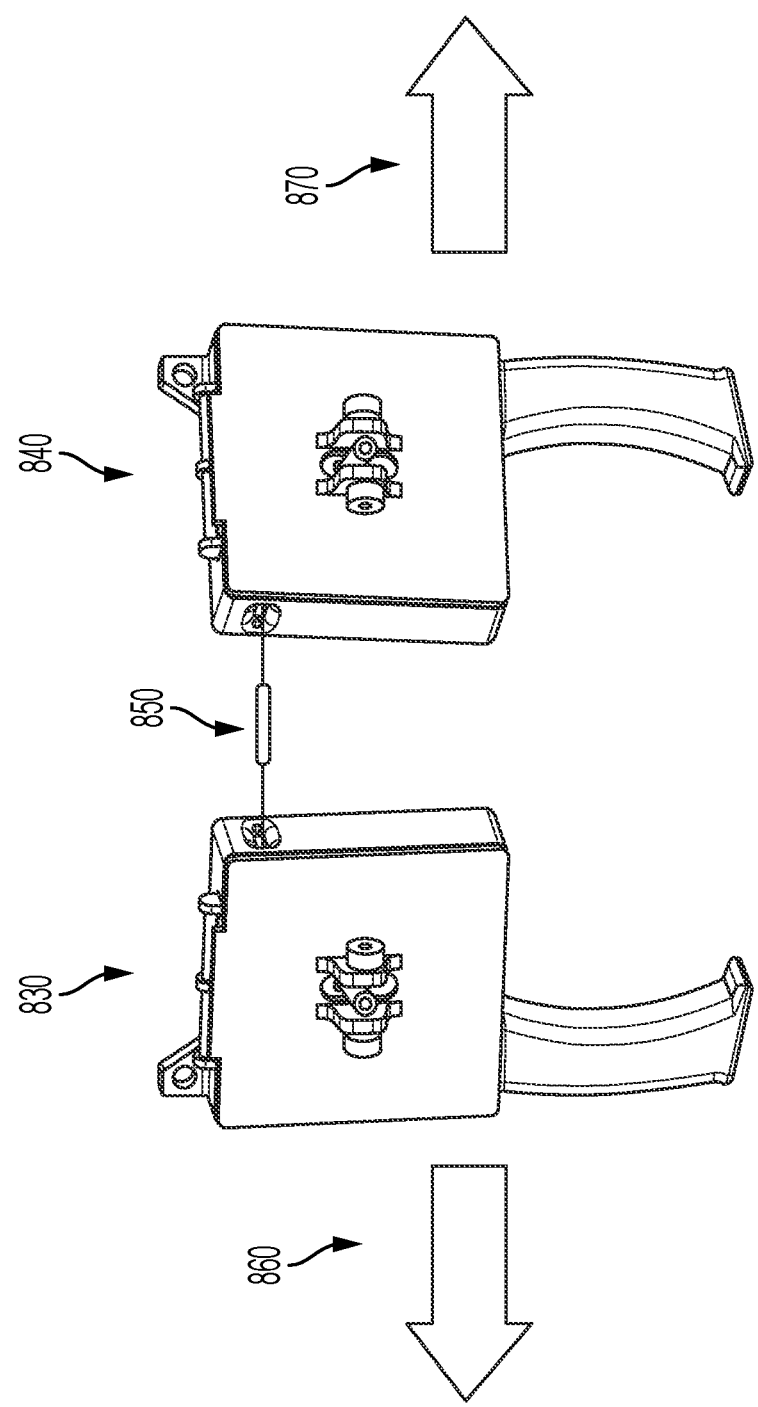

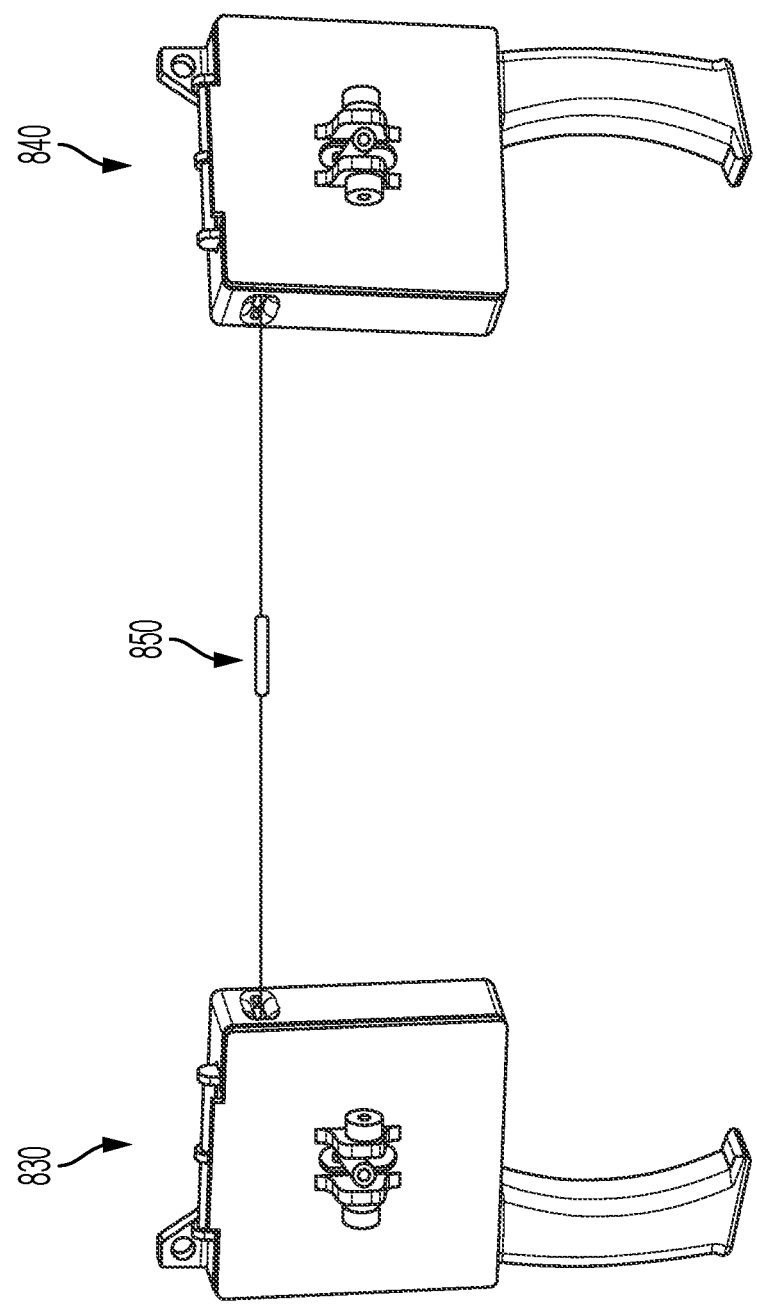

RETRACTABLE REEL FOR HANDLING OPTICAL FIBER

TECHNICAL FIELD

This application relates generally to techniques for structural health monitoring. The application also relates to components, devices, systems, and methods pertaining to such techniques.

BACKGROUND

Fiber optic (FO) sensors can be used for detecting parameters such as strain, temperature, pressure, current, voltage, chemical composition, and vibration. FO sensors are attractive components because they are thin, lightweight, sensitive, robust to harsh environments, and immune to electromagnetic interference (EMI) and electrostatic discharge. FO sensors can be arranged to simultaneously measure multiple parameters distributed in space with high sensitivity in multiplexed configurations over long optical fiber cables. One example of how this can be achieved is through fiber Bragg grating (FBG) sensors. A FBG sensor is formed by a periodic modulation of the refractive index along a finite length (typically a few mm) of the core of an optical fiber. This pattern reflects a wavelength, called the Bragg wavelength, determined by the periodicity of the refractive index profile. The Bragg wavelength is sensitive to external stimulus (strain and/or temperature, etc.) that changes the periodicity of the grating and/or the index of refraction of the fiber. Thus, FBG sensors rely on the detection of small wavelength changes in response to stimuli of interest. In some implementations, FO sensors can be attached to structures and operated to detect parameters, e.g., strain, temperature, vibration, related to the health of the structures.

SUMMARY

Embodiments described herein involve a cassette for optical fiber comprising one or more optical sensors. The cassette comprises a spool for handling optical fiber. An adjustable shaft is disposed such that the spool is configured to rotate about the adjustable shaft. The adjustable shaft is configured to handle spools having different diameters. A spool controller is coupled to the adjustable shaft and configured to rotate the adjustable shaft to perform one or more of extract and retract the optical fiber. One or more bushings are disposed proximate the spool and are configured to prevent the optical fiber from jumping off the spool.

Embodiments involve an apparatus, comprising a cassette for optical fiber comprising one or more optical sensors. The cassette comprises a spool for handling optical fiber. A shaft is disposed such that the spool is configured to rotate about the shaft. A spool controller is coupled to the adjustable shaft and is configured to rotate the adjustable shaft to perform one or more of extract and retract the optical fiber. One or more adjustable bushings are disposed proximate the spool and are configured to prevent the optical fiber from jumping off the spool. The one or more adjustable bushings are configured to adjust to accommodate spools of different diameters;

BRIEF DESCRIPTION OF THE DRAWINGS

Throughout the specification reference is made to the appended drawings wherein:

FIGS. 3A and 3B shows example guide feeds in accordance with embodiments described herein;

FIGS. 8A-8C shows a continuous length of fiber loaded onto two spools in accordance with embodiments described herein;

The figures are not necessarily to scale. Like numbers used in the figures refer to like components. However, it will be understood that the use of a number to refer to a component in a given figure is not intended to limit the component in another figure labeled with the same number.

DETAILED DESCRIPTION

Some embodiments disclosed herein involve apparatuses for attaching FO sensors to structures. Fiber optic sensors can be deployed on various types of structures, e.g., bridges, roadways, railways, and electrical devices such as transformers, to monitor the structural health of the structures. The disclosed embodiments can facilitate mounting FO sensors to the structures in such a way that strain from the structures is transmitted to the sensors. The approaches discussed herein provide for attachment of FO sensors that is flexible enough to attach the FO sensors to a variety of different substrates, e.g. concrete, metal, and wood. Repeatability of the attachment is desired so that at least some or most of the FO sensors have the same pre-strain once attached. The disclosed attachment approaches can be simple and rapid to perform to facilitate the deployment of multiple FO sensors on a structure. Installing optical fibers on structures involves extensive fiber handling during the install. Optical fibers are fragile, and breaks and/or tangles cost time, which is detrimental e.g. because roads must be shut down to service a structure. According to various configurations, the sensors may be fiber Bragg grating (FBG) strain sensors, Fabry Perot sensors, and/or other interferometric optical sensors. In some cases, the sensors may include one or more of electrical and/or resistive sensors, mechanical sensors, and/or other types of strain gages. In some cases, a combination of different types of sensors may be used.

Fiber sensors are manufactured and delivered as multiple sensors on a single fiber strand wound on a compact spool which must be gradually unspooled in a controlled manner. Additionally, sag between attachment points can cause fibers to be susceptible to wind currents and animal or human interference that causes the fiber to break. Embodiments described herein involve a cassette which simplifies fiber handling during fiber sensor deployment. For example, the cassette described herein may be used to minimize the possibility of breaks and tangles and minimize sag in the installed fibers.

Available retractable spools are generally large size, large diameter spools designed for long lengths of jacketed and/or armored fiber. They may have manual or powered retraction mechanisms. Retraction mechanisms based on a spring can generally only handle up to 100 feet, and FBG sensing strands can be much longer (e.g., 200 feet). Fiber optic storage spools for telecommunication applications also have a relatively large size and do not feature a built-in retracting mechanism.

Figure 1:
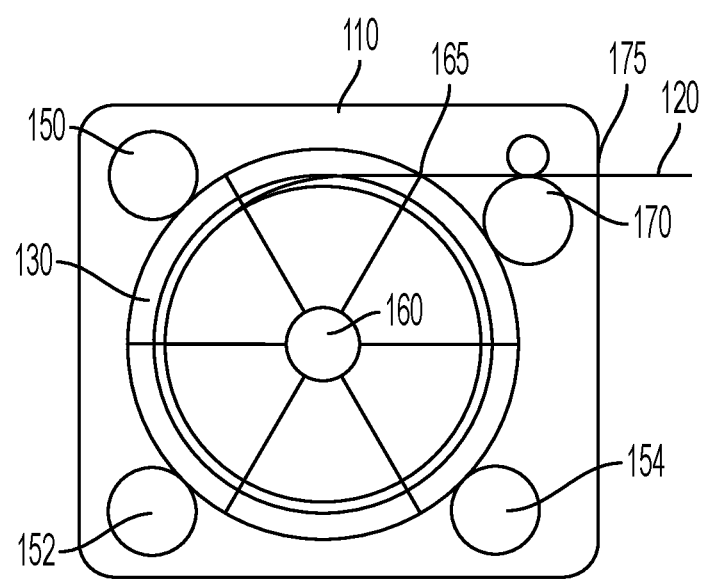
FIG. 1 illustrates an example cassette for handling optical fiber in accordance with embodiments described herein.

FIG. 1 illustrates an example cassette for handling optical fiber in accordance with embodiments described herein. Embodiments described herein involve a cassette 110 that houses an optical fiber spool 130 inside a cassette body in accordance with embodiments described herein. The cassette may have one or more additional mechanisms that may be important for the installation of optical fiber sensors.

For example, the cassette 110 may include one more bushings 150, 152, 154 that help to prevent the optical fiber 120 from jumping off the spool 130. The bushings 150, 152, 154 may be configured to press up against the outside edge of the spool 130 and move along the spool 130 as the spool 130 rotates. The bushings 150, 152, 154 may be configured to move along the spool by one or more of a sliding motion and a rolling motion. For example, the bushings 150, 152, 154 may slide along the spool as it rotates e.g. using a flexible plastic or roll along the spool 130 as with a plastic and/or a rubber bushing.

Figure 2A:
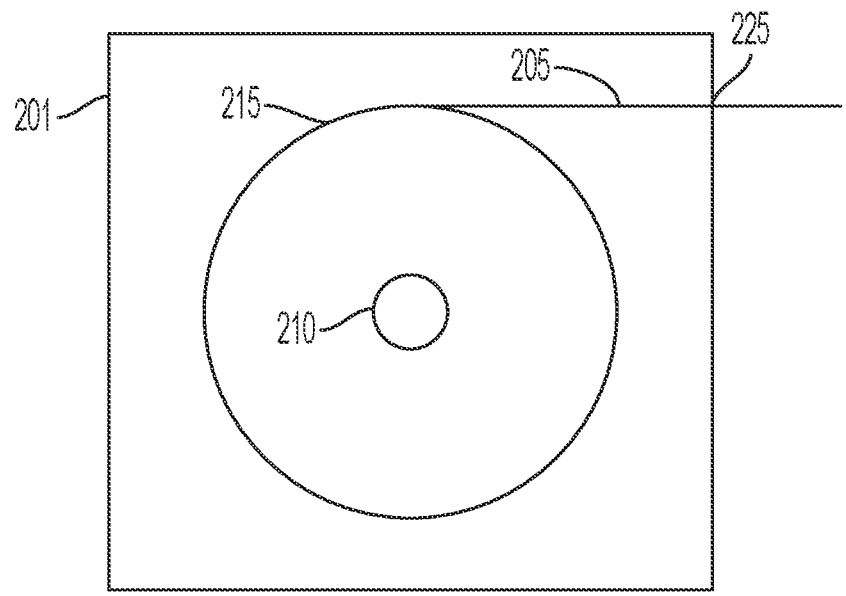
FIGS. 2A-2D show an example cassette having an adjustable shaft position to accommodate different spool sizes in accordance with embodiments described herein.
Figure 2B:
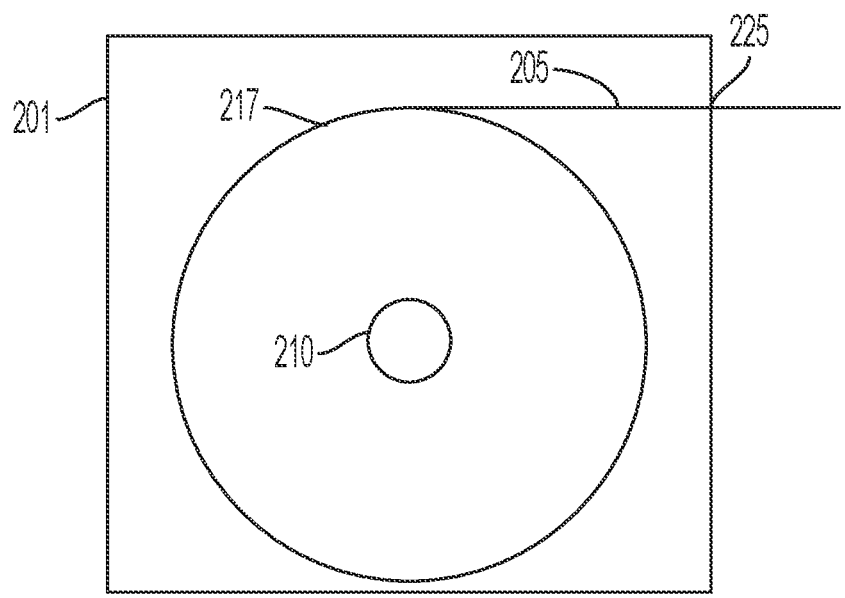

A shaft 160 may be disposed such that the spool 130 is configured to rotate about the shaft. The shaft 160 and/or bushings 150, 152, 154 and/or exit port 175 may be adjustable to accommodate optical fiber spools or different sizes, for example. Having an adjustable shaft position may allow for the optical fiber to maintain a substantially horizontal line between where the fiber exits the spool 165 and where the fiber exits the cassette. FIG. 2A illustrates an example cassette 201 having a shaft 210 in a first position. The first position may be used to accommodate spools having a first diameter range as shown in FIG. 2A. The first shaft position allows optical fiber 205 on spools having the first diameter range to maintain a substantially horizontal line between the spool 215 and the cassette exit 225. FIG. 2B shows the shaft 210 in a second position that may be used to accommodate spools having a second diameter range. The second diameter range may be larger than the first diameter range, for example. The second shaft position allows optical fiber 205 on spools having the second diameter range to maintain a substantially horizontal line between the spool 217 and the cassette exit 225. While FIGS. 2A and 2B show examples where the shaft is configured to be adjusted into two positions, it is to be understood that the shaft may be configured to be adjusted into any number of positions to accommodate a variety of spool sizes.

Figure 2C:
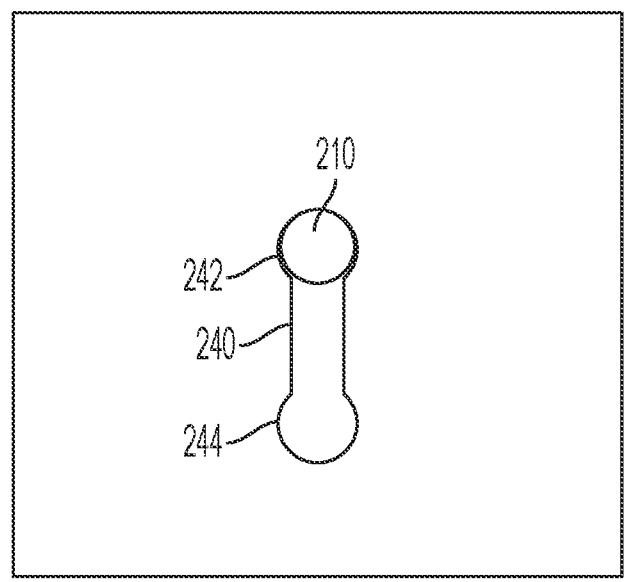
Figure 2D:
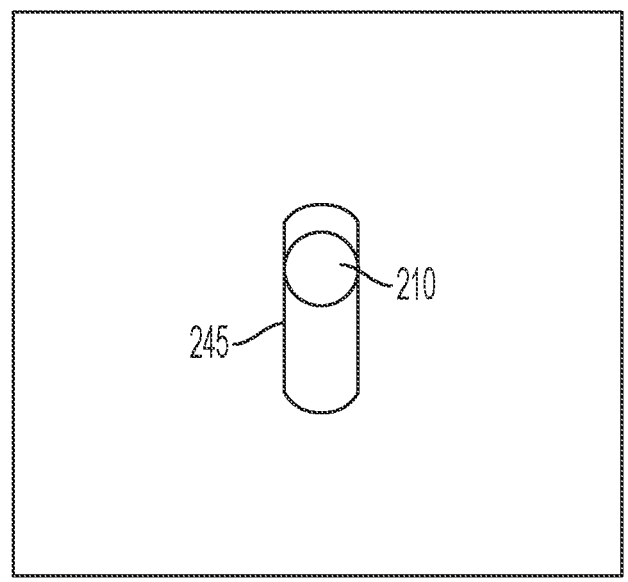

According to various configurations, the shaft 210 may be adjustable into two or more distinct shaft positions 242, 244 along the shaft adjustment mechanism 240 as shown in FIG. 2C. For example, the shaft position may be adjusted by lifting up on the shaft and moving it to a desired location. The cassette housing and/or spool itself may be used to secure the shaft so that it does not move after the spool has been inserted. In some cases, the shaft 210 is configured to be adjustable and secured into place along any part of the shaft adjustment mechanism 245 as shown in FIG. 2D.

Figure 2E:
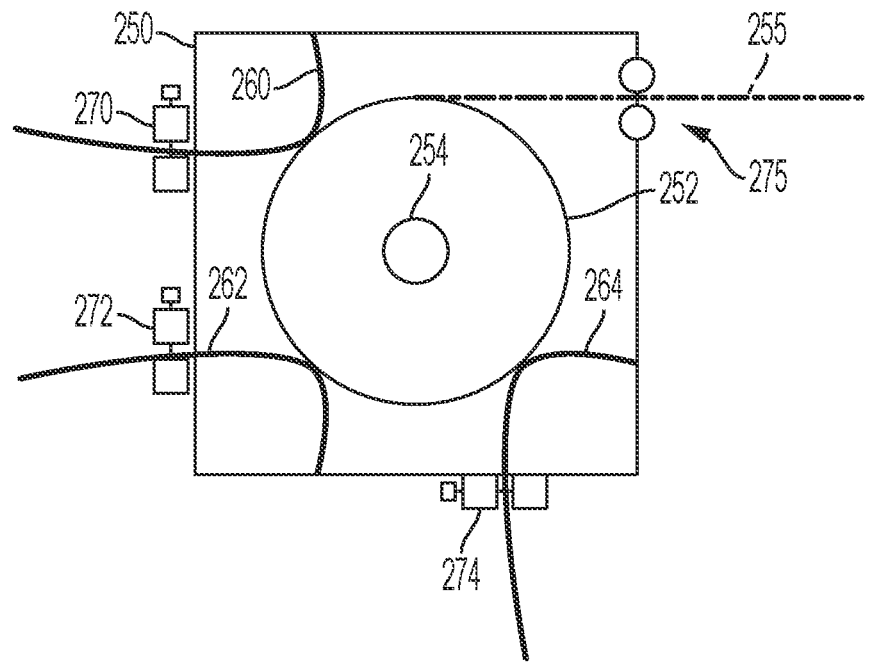
FIGS. 2E and 2F show an example cassette having adjustable bushings configured to accommodate spools of different diameters in accordance with embodiments described herein.
Figure 2F:
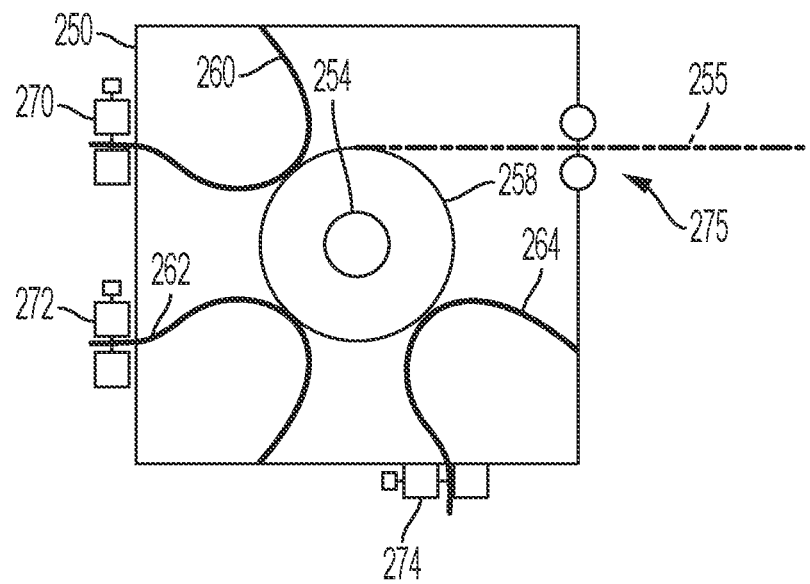

FIGS. 2E and 2F show an example cassette 250 having adjustable bushings 260, 262, 264 in accordance with embodiments described herein. The bushings 260, 262, 264, may include flexible Teflon. In FIGS. 2E and 2F, the spools 252, 258 are configured to rotate about a shaft 254.

FIG. 2E illustrates an example of a cassette 250 accommodating a spool 252 having a first diameter. One or more of the bushings 260, 262, 264 are rigidly fixed to the cassette 250 at one end ad may be configured to slide through a slot on the cassette at a second end. The second end may be adjusted using a set screw 272. According to various configurations, the exit port 275 of the cassette can be adjusted based on the diameter of the spool. For example, the exit port 275 can be adjusted so that there is a substantially straight line between the fiber exit from the spool 252 and the exit port 275. According to various configurations, the exit port is configured to slide along a rail on the cassette 250.

FIG. 2F shows an example of the cassette 250 accommodating a spool 258 having a second diameter. As can be observed, the second diameter is less than the first diameter. The bushings 260, 262, 264 are adjusted so that they are substantially flush with the spool 258. Similarly to FIG. 2E, the exit port 275 is adjusted so that there is a substantially straight line between the fiber exit from the spool 258 and the exit port 275.

Figure 2G:
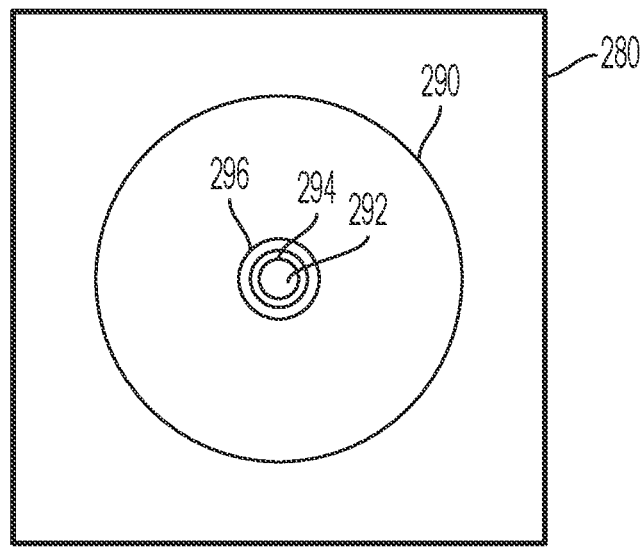
FIGS. 2G-2I illustrate a cassette having a shaft with a flexible clamping mechanism to accommodate different spool keyways in accordance with embodiments described herein.
Figure 2H:
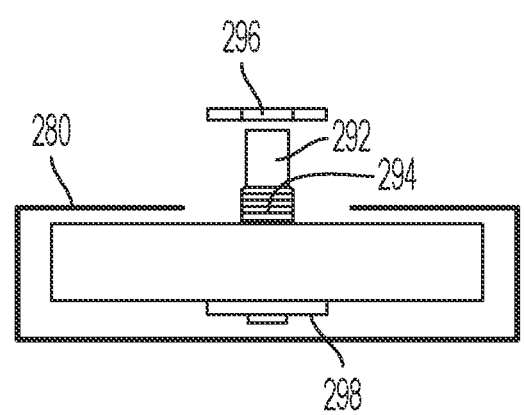
Figure 2I:
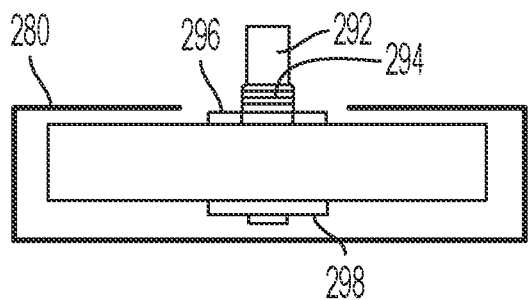

According to various embodiments described herein, the shaft may have a flexible clamping mechanism to accommodate different spool keyways. FIGS. 2G-2I show a cassette 280 configured to accept a spool 290 on a shaft 292. The shaft 292 is small enough that it is able to accept spools having different inner diameters and/or different keyway shapes. This may be done by using a shaft 292 having threads 294. One or more locking rings 296, 298 are configured to secure the spool 290 to the shaft 292. One or more of the locking rings 296, 298 may be configured to thread onto the threads 294 of the shaft 292. In some cases, the bottom ring 298 is fixed to the shaft and the upper ring is configured to thread onto the threads 294 of the shaft and tighten down onto the spool 290 as shown in FIG. 2I.

In some embodiments, the cassette 110 may feature a guide feed 170 located where the optical fiber 120 exits the cassette 110. The guide feed 170 may be configured to move back and forth parallel to the axis of the spool 130 as the optical fiber 120 retracts. This guide feed 170 prevents the retracted optical fiber 120 from bunching up on one end of the spool 130 as the optical fiber 120 retracts. The guide feed 170 may be especially useful when large lengths of optical fiber 120 need to be retracted, such as in the case of a reloadable spool, for example. The guide feed 170 may feature a large bend radius that prevents the optical fiber 120 from undergoing a sharp bend at the exit of the cassette 110. The bend radius may be in a range of about 3 mm to about 10 mm, for example.

Figure 3B:
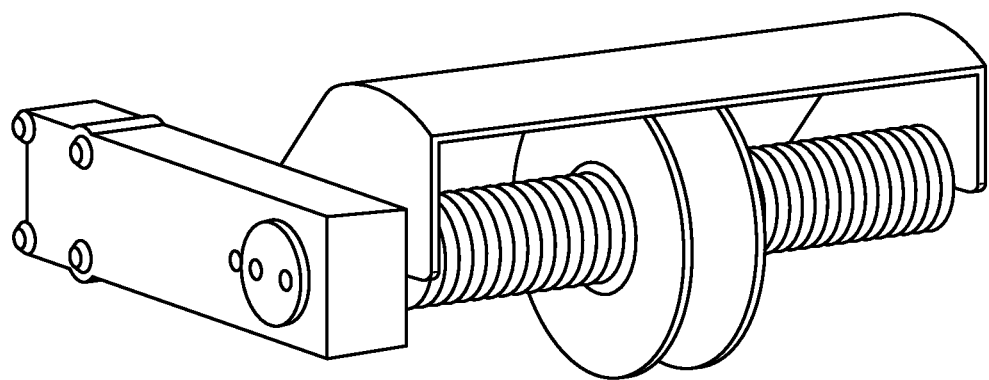

A more detailed view of a guide feed is shown in FIG. 3A. A side view 302 and a front view 304 of a cassette 310 is shown. The guide feed assembly 360 is configured to guide the fiber 340 between the spool 320 and the exit port 350 of the cassette 310. The guide feed 364 may be configured to move back and forth parallel to the axis of the spool 320 along a screw 362 (e.g., a self-reversing lead screw or a "diamond" lead screw) as the spool 320 is rotated. The guide feed assembly 360 may be used to distribute the fiber 340 uniformly over the spool 320 as the fiber 340 is retracted. According to various embodiments, the rotating shaft 330 causes the screw 362 to rotate (e.g., via a gear and/or a belt). The rotation of the screw 362 moves the guide feed 364 back and forth. FIG. 3B illustrates an example guide feed in accordance with embodiments described herein.

Figure 4A:
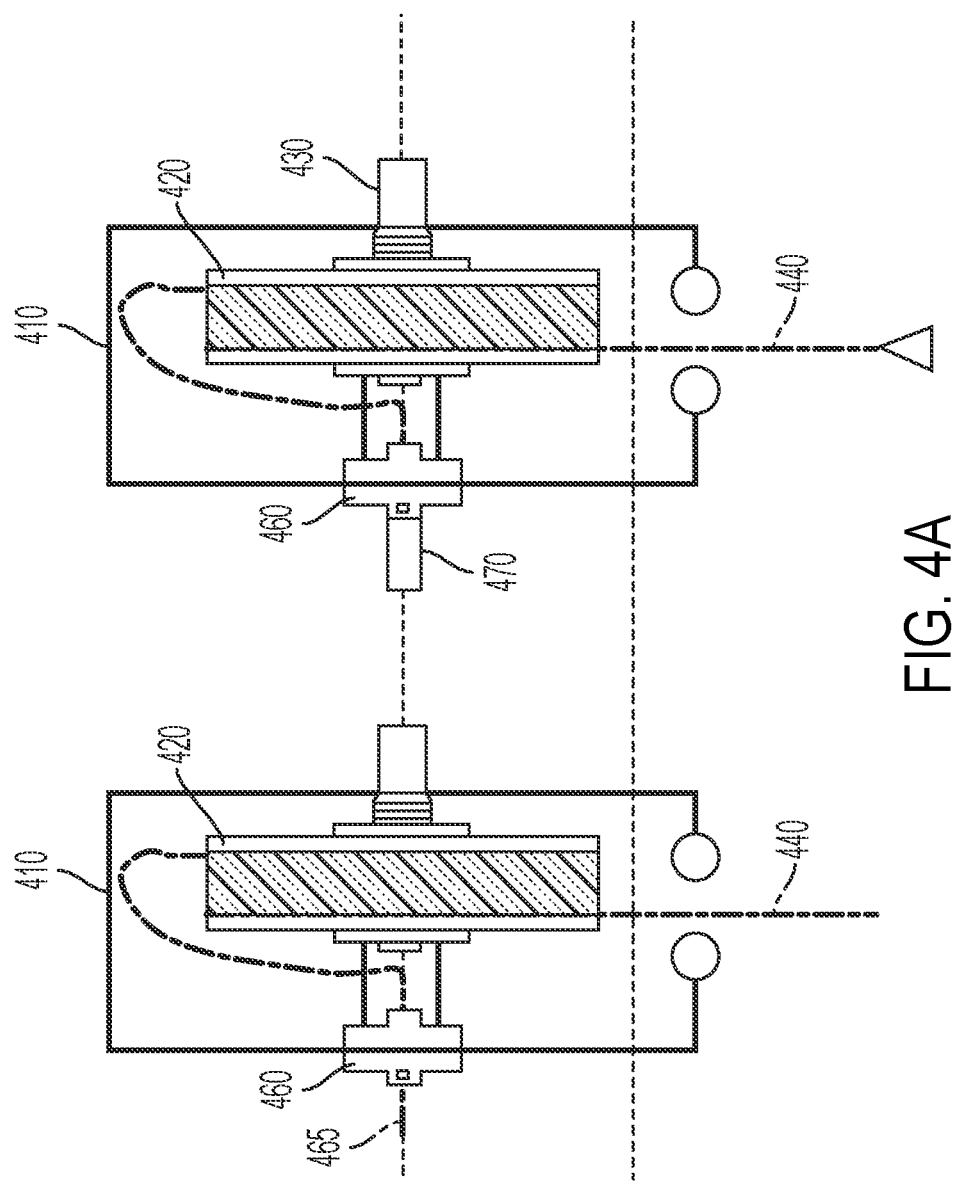
FIGS. 4A and 4B illustrates example fiber optic rotary joints in accordance with embodiments described herein.
Figure 4B:
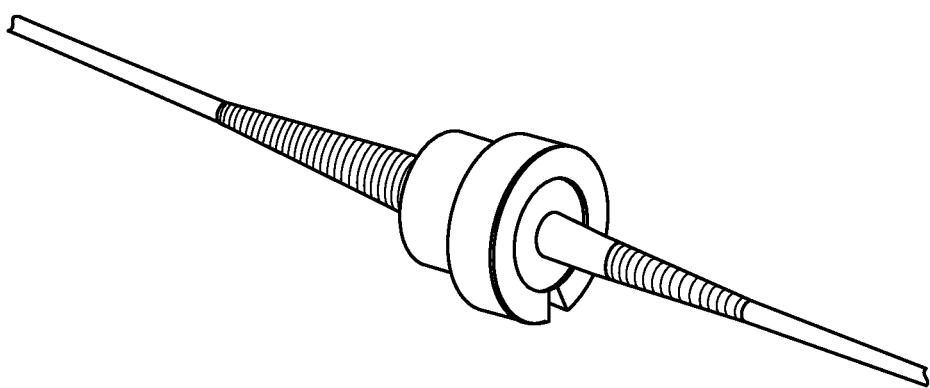

Some embodiments may feature a fiber optic rotary joint as shown in FIG. 4A. The fiber optic rotary joint 460 may be configured to maintain alignment between two fibers even as one rotates. This enables a continuous connection from a fiber outside the cassette to the fiber on the spool even as the spool is unwound. Some embodiments may feature a light source 470 such as a laser or LED built into the cassette. Light from this source is coupled into the spool fiber to locate faults or sensing points using scattered light. The rotary joint 460 may straddle the inside and outside of the cassette 410. The fiber optic rotary joint 460 is configured to maintain alignment between fiber on the spool 420 and external fiber 465 and/or a light source 470. According to various configurations the rotary joint 460 rotation is at least parallel to the spool axis. In some cases, the rotary joint 460 rotation is coaxial with the spool axis. FIG. 4B illustrates an example fiber optic rotary joint in accordance with embodiments described herein.

Figure 5:
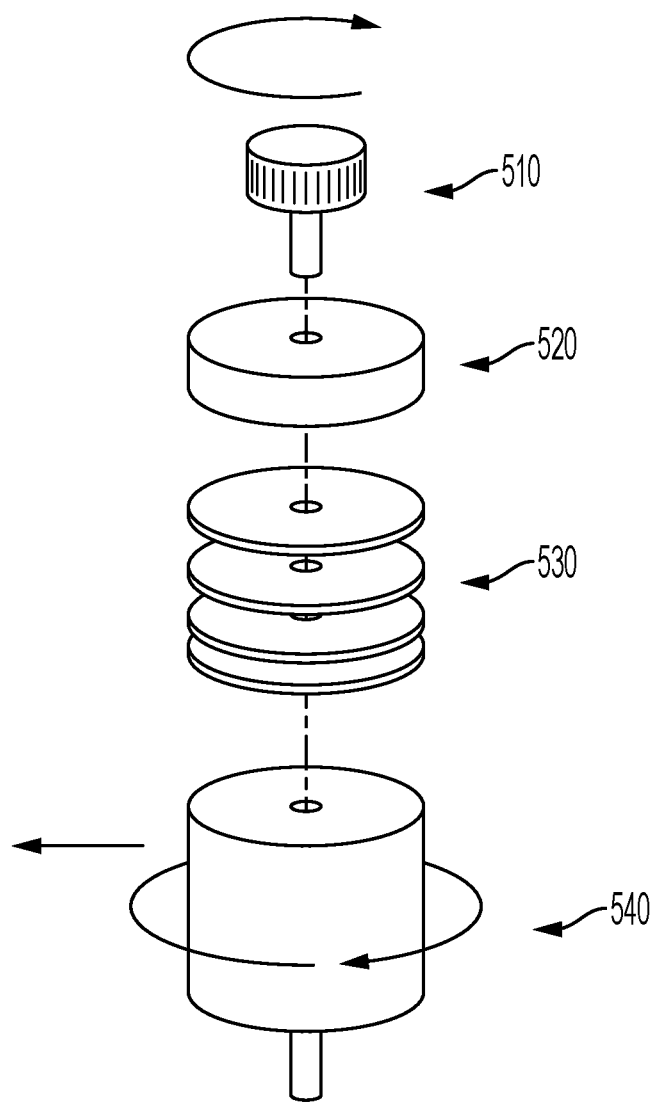
FIG. 5 shows an example braking mechanism in accordance with embodiments described herein.

Some embodiments may include a drag adjustment mechanism and/or braking mechanism that allows the line tension to be adjusted during extraction and/or to lock the spool so that no additional fiber may be extracted. This could be adjusted using a knob, set screw, and/or handle, for example. FIG. 5 shows an example braking mechanism in accordance with embodiments described herein. In this example, tightening the knob 510 puts pressure on a brake plate 520. The pressure on the break plate causes one or more washers to tighten in small increments 530. The increased tension caused by the washers being pressed together increases the resistance of the spool to rotation and slows the rate at which the optical fiber comes off the reel 540.

Figure 6A:
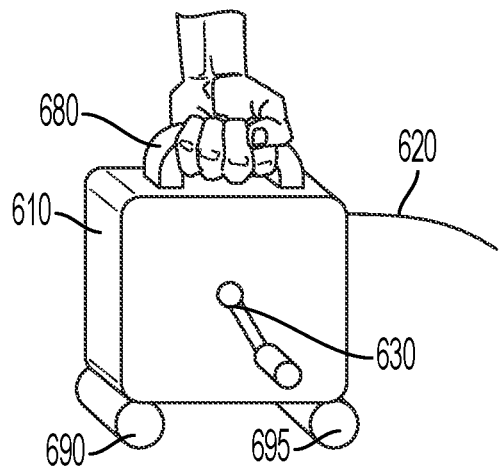
FIG. 6A illustrates the cassette housing being carried using a handle in accordance with embodiments described herein.
Figures 6B, 6C:
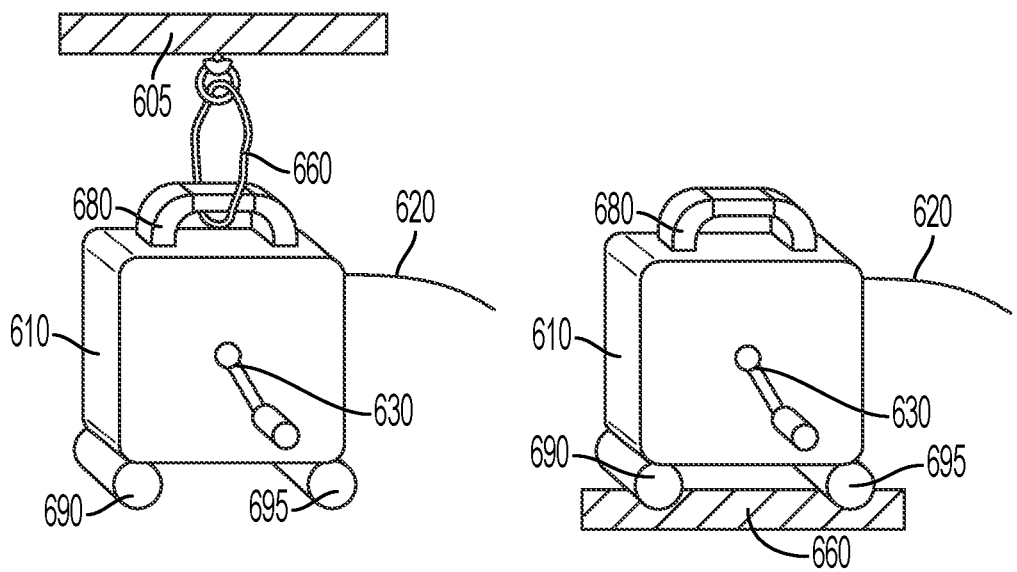
FIG. 6B shows an example of the cassette housing being attached to a structure in accordance with embodiments described herein.
FIG. 6C shows an example of the cassette housing that is configured to be free standing in accordance with embodiments described herein.

According to various embodiments described herein, the cassette may be configured to be handheld, attached to a human body, attached to a structure, and/or free standing as shown in FIGS. 6A-6C.

Specifically, FIG. 6A illustrates the cassette housing 610 being carried using a handle 680. The cassette housing 610 also may be attached to a surface of a structure 605 as shown in FIG. 6B. For example, a carabiner 660 may be used to attach the cassette housing to the structure 605. The cassette may also be free-standing as shown in the example of FIG. 6C. Optional stand-offs 690, 695 may be used to separate the cassette housing from the ground and/or other surface 660. In the examples of FIGS. 6A-6C a manual crank 630 is shown that may be used to extract and/or retract the optical fiber 620. According to various embodiments, the extraction and/or retraction mechanism is one or more of a knob, a handle, a magnetic mechanism, and/or a powered mechanism such as a motor, for example. Inside the cassette is a spool as described in conjunction with FIG. 1. As described above, the spool has a length of fiber which may contain fiber sensors wound around it. In some embodiments the spool is removable and/or replaceable by disassembling the cassette and replacing the spool. This spool may be pre-loaded with fiber, or the fiber may later be wound around the spool using the retraction mechanism of the cassette. In some embodiments, the cassette is fully sealed with the spool plus fiber inside and is designed for a single use. In some embodiments, the fiber cassette has a body handle for handheld operation or attachment to a structure. In some embodiments, the fiber cassette has no crank handle, no body handle, no standoffs, no attachment points, and in general a minimum of features on the outside in order to minimize the possibility of snags.

Figure 7A:
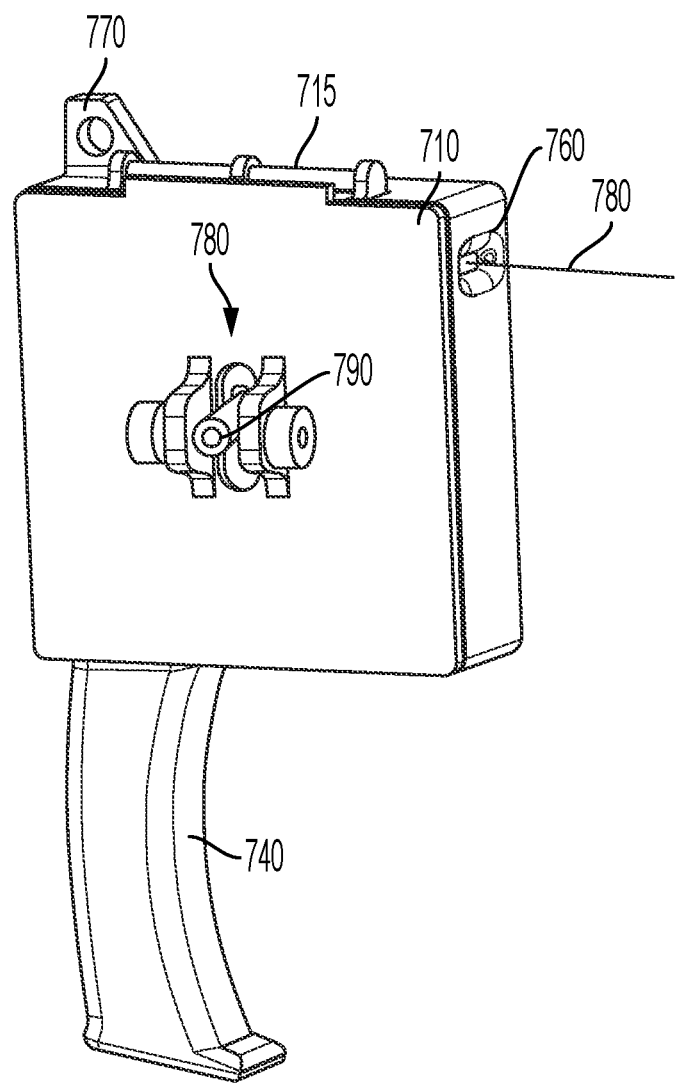
FIG. 7A shows an example cassette with a closed lid in accordance with embodiments described herein.
Figure 7B:
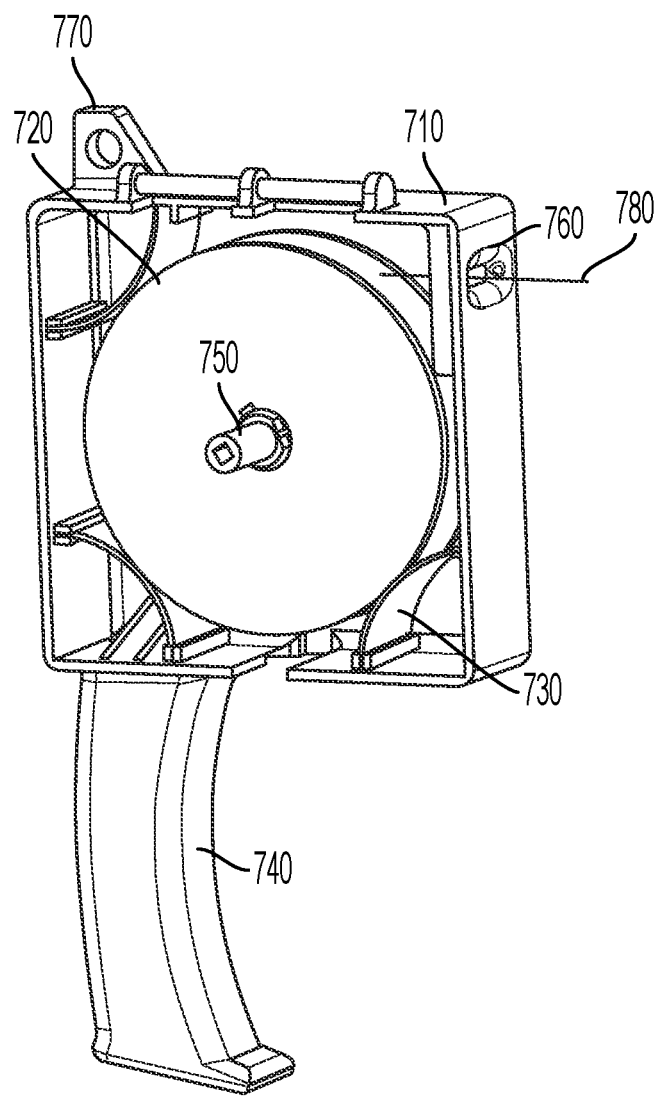
FIG. 7B illustrate the cassette of FIG. 7B with the lid removed allowing for replacement of the spool in accordance with embodiments described herein.

FIGS. 7A and 7B illustrate an example cassette having a handle in accordance with embodiments described herein. In the example shown in FIG. 7A the cassette has a housing or enclosure having two portions 710, 712 and a fiber exit port 760. The exit port may be a continuous solid loop such that fiber can only be loaded from the end, or it may be a split loop or a loop that can be disassembled and reassembled so that the fiber can be loaded from the side. The cassette housing may be configured to isolate the optical fiber from the environment. The first housing portion 710 (i.e., lid) is configured to be attached to the second housing portion 712 via a connection point 715 to allow insertion, extraction, and/or replacement of spools having optical fiber. In some cases, the connection point is a hinge or similar mechanical structure, that allows the first housing portion 710 to be temporarily lifted away from the second housing portion 712 and exposing the spool 720. According to various embodiments, the housing is a solid piece such that the spool is not designed to be removed from the housing. The cassette housing may have a handle 740 to allow for easier handling of the device.

The first housing portion 710 and/or the second housing portion 712 may have an spool controller attachment 790 for retracting and/or extracting the optical fiber 795. The spool controller may include one or more of a crank, a knob, a handle, a magnetic mechanism, and/or a powered mechanism such as a motor, for example and/or other type of system. A brake mechanism 780 may be disposed proximate the attachment point 790. The cassette 700 may have one or more attachment points 770 configured to allow for attachment of the housing to a structure, for example. While the example shown in FIGS. 7A and 7B show a single attachment point 770, it is to be understood that any number of attachment points may be included on the cassette housing.

FIG. 7B shows the cassette housing with the first housing portion 710 removed. As can be observed, the spool 720 and the shaft 750 are exposed. The spool may be removed and/or replaced. The example shown in FIG. 7B shows bushings 730 that are described in more detail in conjunction with FIG. 1.

Figure 8A:
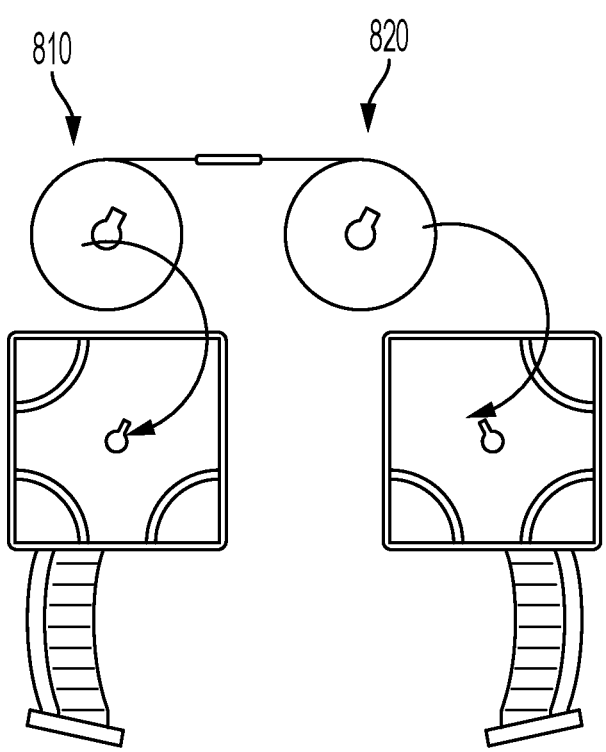

FIG. 8A shows a continuous length of fiber loaded onto two spools 810, 820 with the first housing portion not shown. Using an exit port of a type where the fiber can be loaded from the side, each spool is loaded into a cassette. FIG. 8B shows the two cassettes 830, 840 with the spools loaded inside with the first housing portion shown. Starting from this configuration, the spools may each be separately unwound from a common point 850 along directions 860 and 870. This action is desirable in cases where the fibers on either side of the common point are different or have different functions within a fiber sensing system. For example, the fiber on one side may contain the fiber sensors, while the fiber on the other side is a transport fiber that does not contain sensors. In this case the common point 850 would be chosen to be close to where the first sensor should be positioned e.g. close to the bridge. That way one cassette can be unspooled in a direction 860 along the bridge while the other cassette can be unspooled in a direction 870 towards the splice box/sensor readout.

Figure 9A:
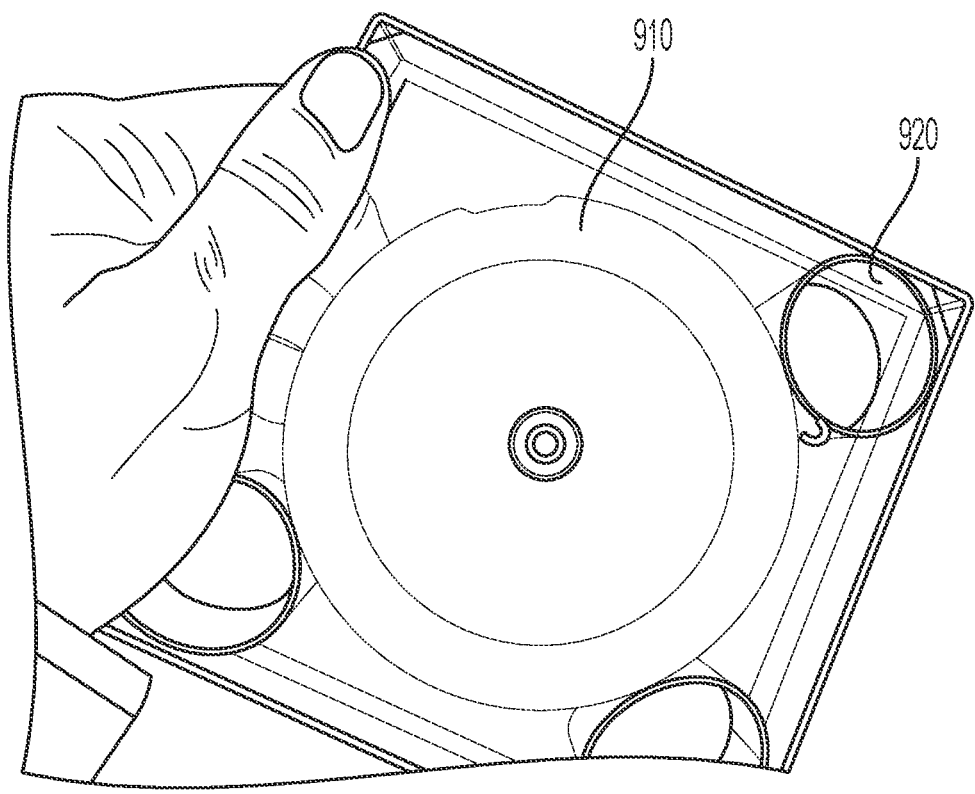
FIGS. 9A and 9B show views of an example cassette in accordance with embodiments described herein.
Figure 9B:
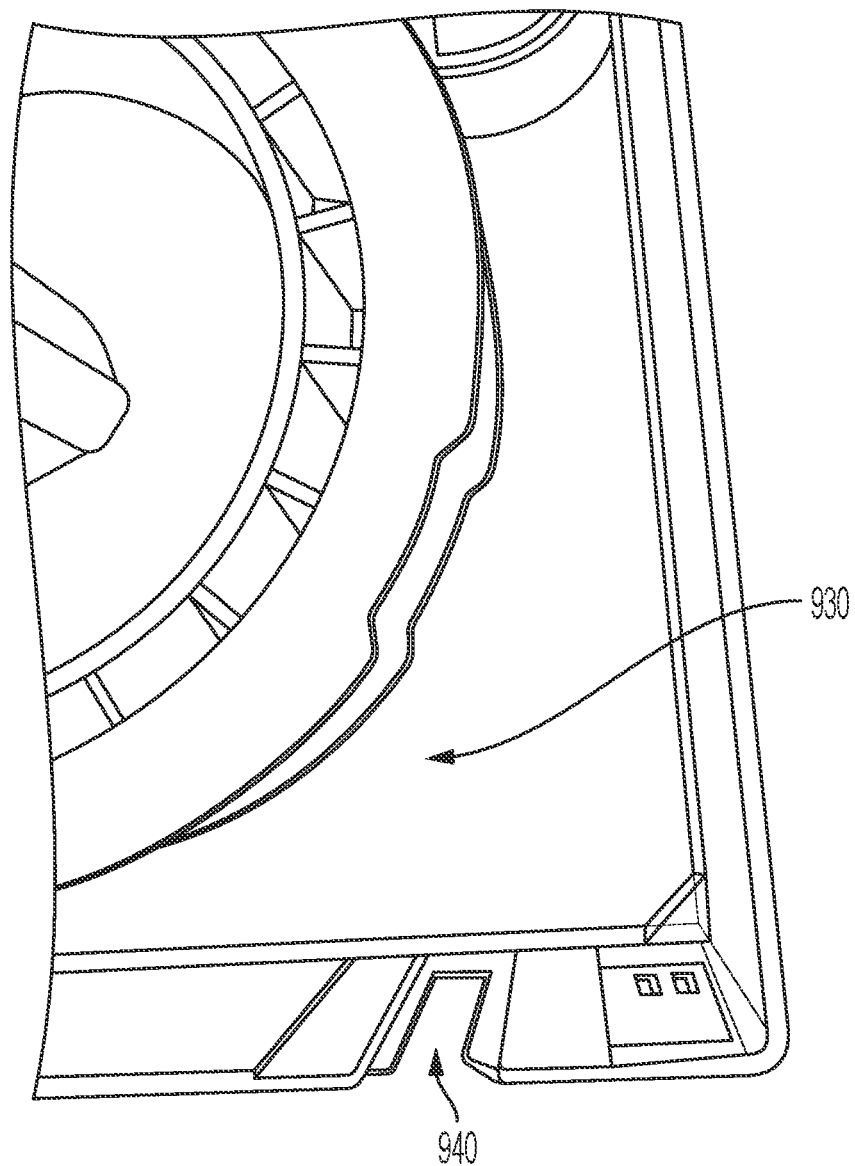

FIGS. 9A and 9B show views of an example cassette in accordance with embodiments described herein. FIG. 9A shows an example cassette having a spool 910 and one or more bushings 920. FIG. 9B shows a closer view of the example cassette of FIG. 9A at the exit location 940 of the optical fiber 930.

Figure 10A:
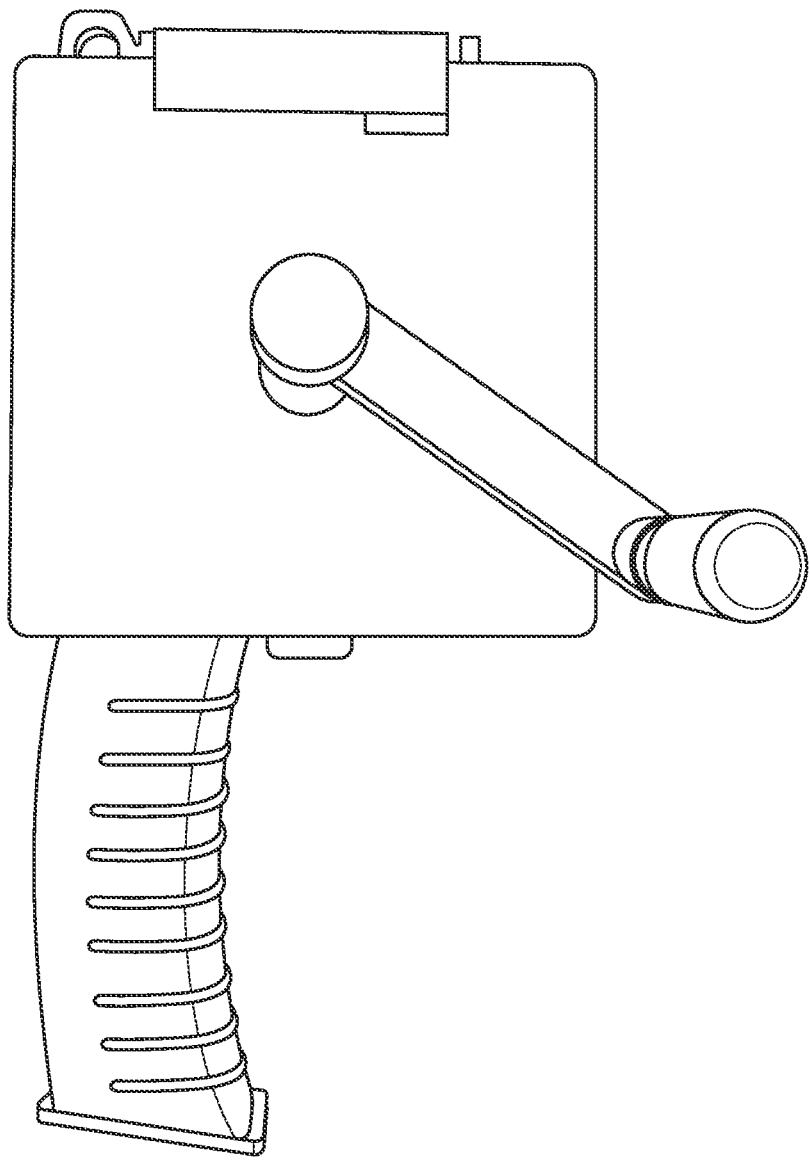
FIGS. 10A-10D show another example of a cassette in accordance with embodiments described herein.
Figure 10B:
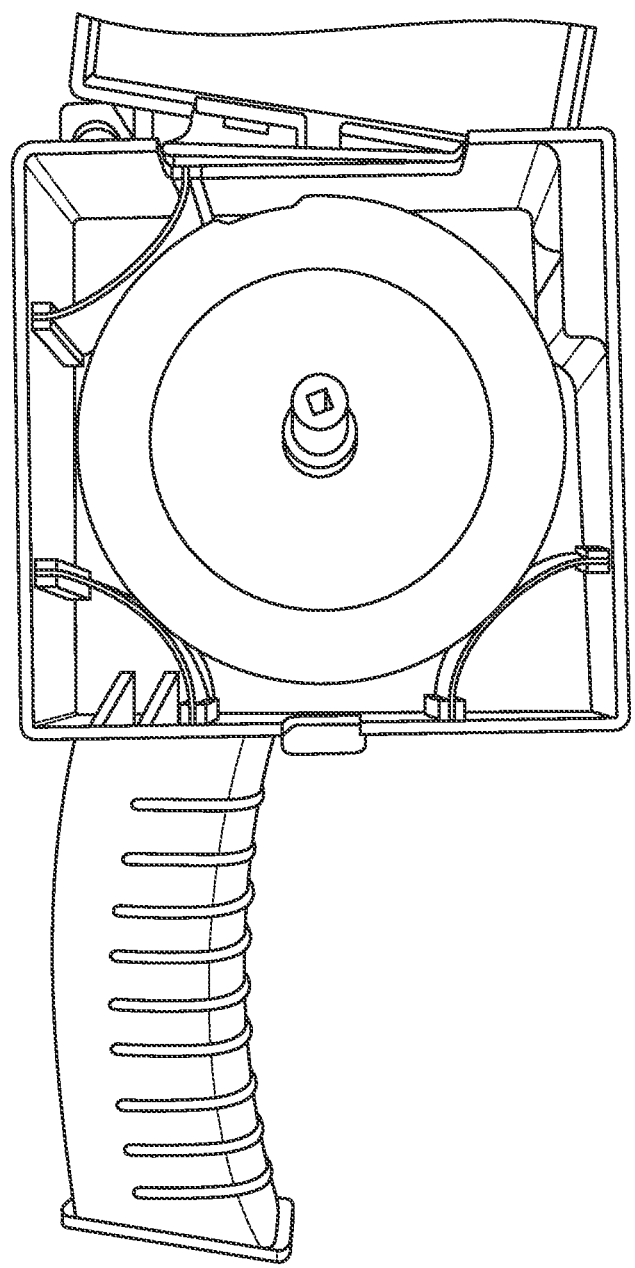
Figure 10C:
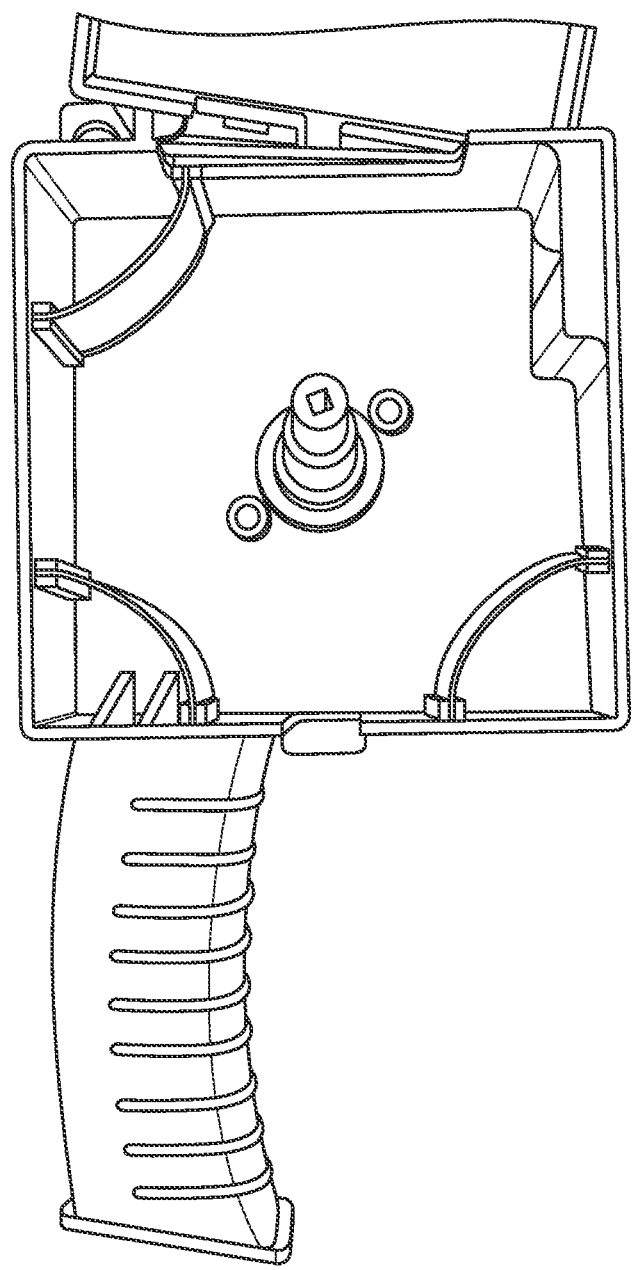
Figure 10D:
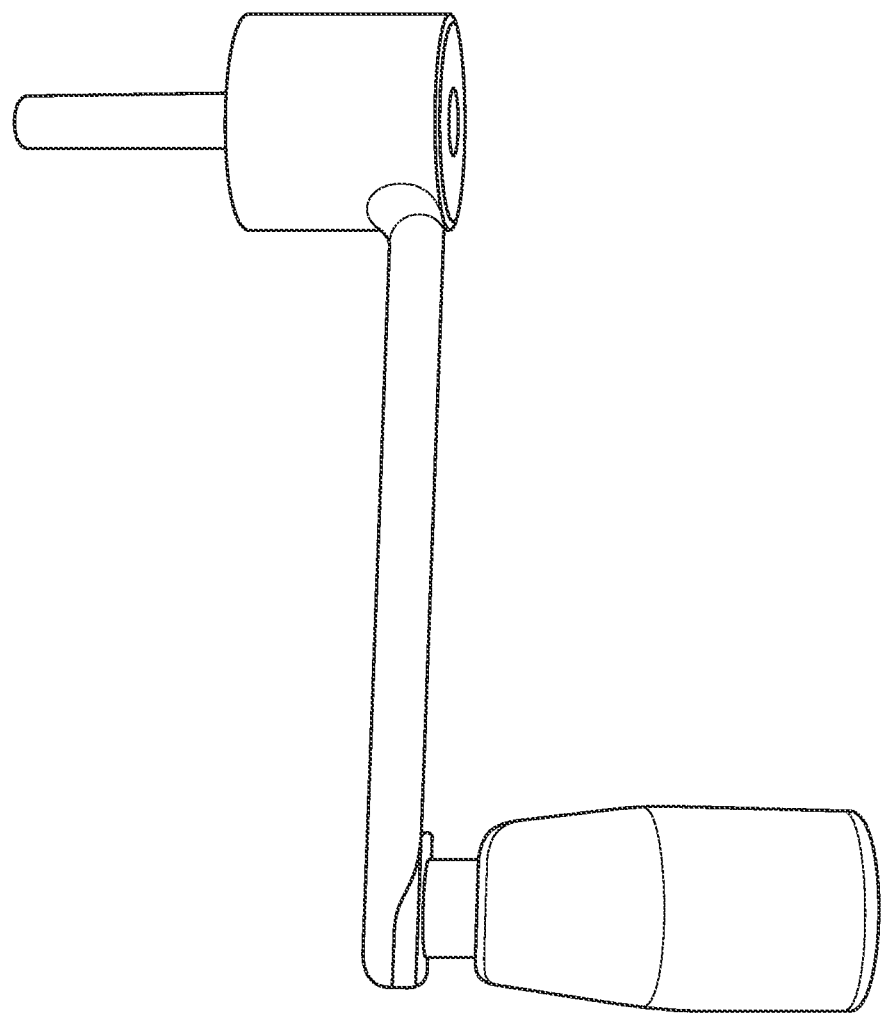

FIGS. 10A-10D show another example of a cassette in accordance with embodiments described herein. Specifically, FIG. 10A illustrates a cassette having a housing that is closed. The cassette has a crank that is configured to extract and/or retract the optical fiber. FIG. 10B shows the cassette of FIG. 10A with the cover removed revealing the shaft, bushings, and spool. FIG. 10C illustrates the cassette of FIG. 10B with the spool removed. FIG. 10D shows the crank. The crank may be configured to be removable or fixed.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein. The use of numerical ranges by endpoints includes all numbers within that range (e.g. 1 to 5 includes 1, 1.5, 2, 2.75, 3, 3.80, 4, and 5) and any range within that range.

The various embodiments described above may be implemented using circuitry and/or software modules that interact to provide particular results. One of skill in the computing arts can readily implement such described functionality, either at a modular level or as a whole, using knowledge generally known in the art. For example, the flowcharts illustrated herein may be used to create computer-readable instructions/code for execution by a processor. Such instructions may be stored on a computer-readable medium and transferred to the processor for execution as is known in the art.

The foregoing description of the example embodiments have been presented for the purposes of illustration and description. It is not intended to be exhaustive or to limit the inventive concepts to the precise form disclosed. Many modifications and variations are possible in light of the above teachings. Any or all features of the disclosed embodiments can be applied individually or in any combination, not meant to be limiting but purely illustrative. It is intended that the scope be limited by the claims appended herein and not with the detailed description.

What is claimed is:

1. An apparatus, comprising:
  a cassette for optical fiber comprising one or more optical sensors, the cassette comprising:
    a spool for handling optical fiber;
    an adjustable shaft disposed such that the spool is configured to rotate with the adjustable shaft, the adjustable shaft configured to handle spools having different diameters;
    a spool controller coupled to the adjustable shaft and configured to rotate the adjustable shaft to perform one or more of extract and retract the optical fiber; and
    one or more bushings proximate the spool configured to prevent the optical fiber from jumping off the spool;
    wherein the bushings are adjustable to accommodate different spool types.

2. The apparatus of claim 1, wherein the one or more optical sensors comprise one or more fiber Bragg grating (FBG) sensors.

3. The apparatus of claim 1, wherein the one or more bushings are configured to move along the spool as the spool rotates.

4. The apparatus of claim 3, wherein the one or more bushings are configured to move along the spool by one or more of a sliding motion and a rolling motion.

5. The apparatus of claim 1, wherein the spool controller comprises a crank.

6. The apparatus of claim 1, further comprising a guide feed disposed proximate a fiber exit location of the cassette.

7. The apparatus of claim 6, wherein the guide feed comprises a bend radius in a range of about 3 mm to about 10 mm.

8. The apparatus of claim 1, further comprising a fiber optic rotary joint configured to maintain alignment between at least two optical fibers as one of the optical fibers rotates.

9. The apparatus of claim 1, further comprising a drag adjustment mechanism configured to adjust a tension needed to extract the optical fiber.

10. The apparatus of claim 1, further comprising an enclosure configured to isolate the optical fiber from an environment until the optical fiber is extracted.

11. The apparatus of claim 10, further comprising a lid at least partially covering the enclosure that is configured to be removed to insert spools of optical fiber.

12. The apparatus of claim 1, wherein the adjustable shaft comprises a flexible clamping mechanism configured to accommodate different spool keyways.

13. The apparatus of claim 1, wherein the adjustable shaft is configured to have an adjustable position relative to the spool to accommodate different spool diameters such that a fiber exit location is along a horizontal tangent line to the spool.

14. The apparatus of claim 1, wherein the cassette comprises a handle.

15. The apparatus of claim 1, wherein the cassette comprises at least one hole configured to accommodate a carabiner.

16. An apparatus, comprising:
  a cassette for optical fiber comprising one or more optical sensors, the cassette comprising:
    a spool for handling optical fiber;
    a shaft disposed such that the spool is configured to rotate with the shaft;
    a spool controller coupled to the shaft and configured to rotate the shaft to perform one or more of extract and retract the optical fiber; and
    one or more adjustable bushings in contact with the spool and configured to prevent the optical fiber from jumping off the spool, the one or more adjustable bushings configured to adjust to accommodate spools of different diameters.

17. The apparatus of claim 16, wherein the one or more optical sensors comprise one or more fiber Bragg grating (FBG) sensors.

18. The apparatus of claim 16, wherein the one or more bushings are configured to move along the spool as the spool rotates.

19. The apparatus of claim 18, wherein the one or more bushings are configured to move along the spool by one or more of a sliding motion and a rolling motion.

* * * * *